United States Patent [19]

Sauve

[11] Patent Number: 5,639,052
[45] Date of Patent: Jun. 17, 1997

[54] FLEXIBLE CUPHOLDER

[75] Inventor: Paul J. Sauve, Warren, Mich.

[73] Assignee: Chrysler Corporation, Auburn Hills, Mich.

[21] Appl. No.: 513,590

[22] Filed: Aug. 14, 1995

[51] Int. Cl.$^6$ ........................................ A47K 1/08
[52] U.S. Cl. .................... 248/311.2; 248/224.7; 248/314; 224/926
[58] Field of Search ............... 248/224.7, 311.2, 248/312.1, 314; 224/926

[56] References Cited

U.S. PATENT DOCUMENTS

| | | | |
|---|---|---|---|
| 213,034 | 3/1879 | Bingham | 248/311.2 X |
| 1,077,027 | 10/1913 | Austin | 248/312.1 X |
| 2,279,442 | 4/1942 | Burns et al. . | |
| 2,406,334 | 8/1946 | Keller et al. | 248/311.2 |
| 2,518,538 | 8/1950 | Giblin | 248/311.2 X |
| 2,893,675 | 7/1959 | Smith et al. . | |
| 2,926,879 | 3/1960 | Dietrich | 248/311.2 |
| 3,127,144 | 3/1964 | Warner | 248/312.1 X |
| 3,306,566 | 2/1967 | Paulson et al. | 248/311.2 X |
| 3,532,318 | 10/1970 | Lloyd | 248/311.2 |
| 3,842,981 | 10/1974 | Lambert | 248/311.2 X |
| 3,991,961 | 11/1976 | Platzer, Jr. . | |
| 4,063,701 | 12/1977 | Wray . | |
| 4,106,629 | 8/1978 | Doyle et al. . | |
| 4,191,350 | 3/1980 | Ormond | 248/311.2 X |
| 4,418,883 | 12/1983 | Cohen | 248/312.1 |
| 4,573,653 | 3/1986 | Boettger . | |
| 4,852,843 | 8/1989 | Chandler . | |
| 5,092,395 | 3/1992 | Amidzich | 248/311.2 X |
| 5,292,140 | 3/1994 | Laing | 248/311.2 X |
| 5,295,650 | 3/1994 | Brandt . | |
| 5,472,157 | 12/1995 | Lehrman | 248/311.2 X |
| 5,484,129 | 1/1996 | Megal | 248/311.2 |
| 5,511,754 | 4/1996 | Johannsen | 248/311.2 |

*Primary Examiner*—Leslie A. Braun
*Assistant Examiner*—Richard M. Smith
*Attorney, Agent, or Firm*—Thomas G. Pasternak

[57] ABSTRACT

A container holding assembly for a vehicle including an interior trim panel having an inside surface and an outside surface. Container holding assembly comprises an arcuate support member and a cylindrically-shaped net of flexible material including a top end annular border defining an opening and a bottom end annular border. The net top end annular border is secured to the support member so that the net is adapted to be suspended in a free state from the support member. The support member is constructed from a one-piece wire form, having a substantially circular shape, defining a closed end portion terminating in parallel end portions laterally spaced apart a predetermined dimension. The trim panel includes a pair of holes extending through the trim panel. The holes are laterally spaced apart a dimension equal to the predetermined dimension of the parallel end portions so that the end portions may be inserted therein in a removably retained manner.

1 Claim, 3 Drawing Sheets

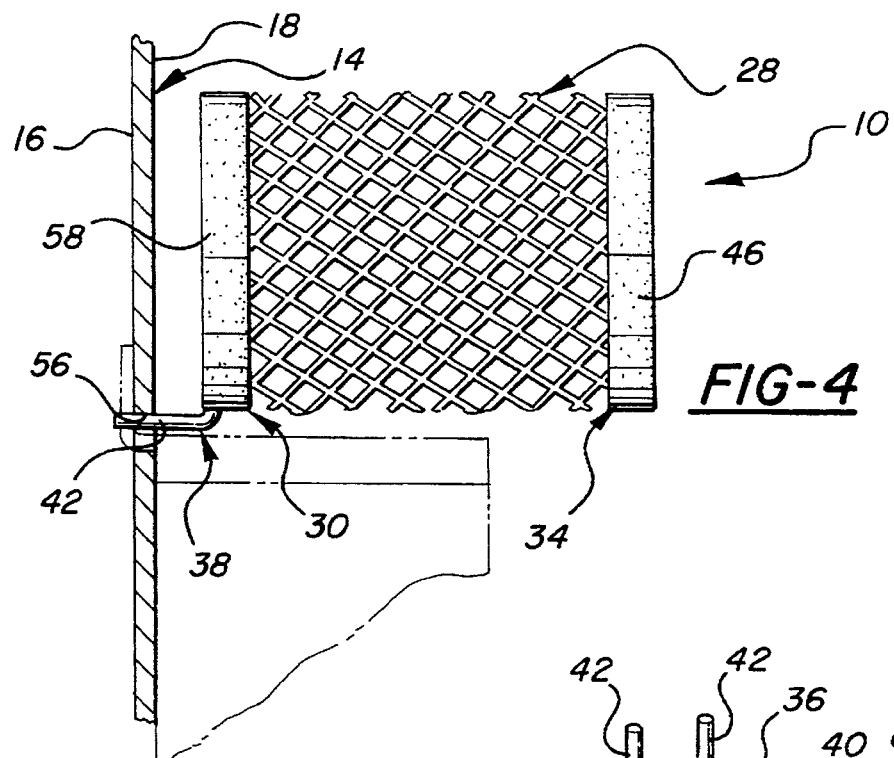
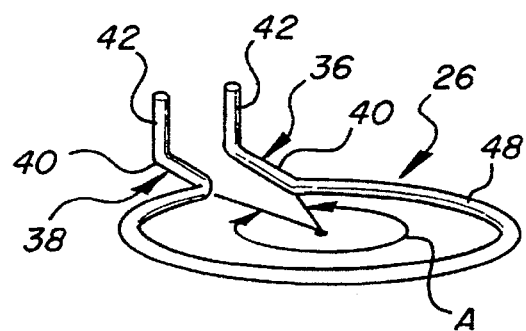
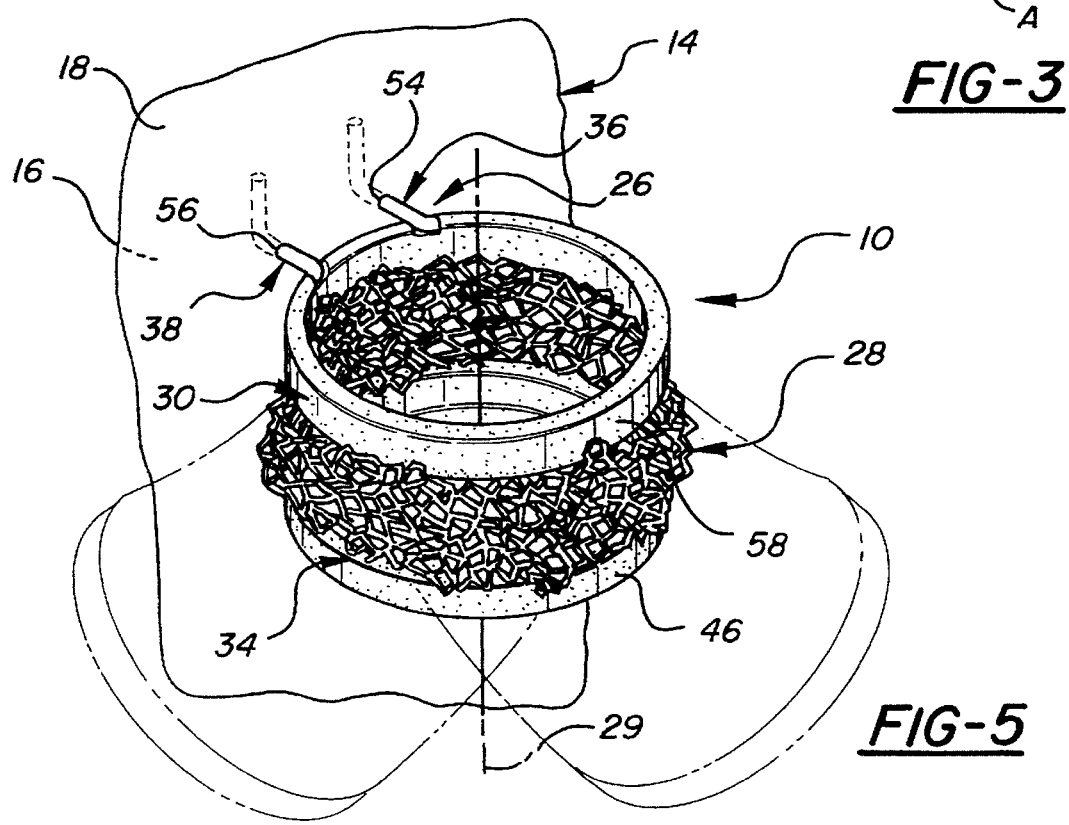

FLEXIBLE CUPHOLDER

FIELD OF THE INVENTION

This invention relates to beverage container holding assemblies for use in motor vehicles and, in particular, to cupholders constructed from a soft flexible material.

BACKGROUND OF THE INVENTION

Beverage cupholder assemblies are common in today's vehicles. Many differing types of such beverage cupholders exist and they can be mounted in various positions within the vehicle. These cupholders are typically moveable between a stowed or concealed position within a housing recess and an extended or use position removed from the recess and are constructed from a rigid plastic material. Due to space considerations, it is sometimes not possible to have a cupholder which is moveable between a stowed position and an extended or use position. However, it then becomes necessary to provide a cupholder constructed from a soft flexible material so that the cupholder does not obstruct the driver or passengers movement within the vehicle as would be the case with a cupholder constructed from a hard, rigid plastic material.

SUMMARY OF THE INVENTION

The present invention provides a container holding assembly for a vehicle including an interior trim panel having an inside surface and outside surface. The container holding assembly of the present invention further includes an arcuate support member, a cylindrically-shaped net including a top end annular border, defining an opening, and a bottom end annular border. The net is secured to the support member at the top end so that the net is adapted for suspension in a free state from a wire loop support member. The net is constructed from a flexible fabric mesh material so that the net is collapsible from a first use position, wherein the bottom end is spaced apart from the top end and a second stowed position, wherein the bottom meets the top end. The support member includes first and second spaced apart ends. The first end defines a first L-shaped fastener and the second end defines a second L-shaped fastener for fast and easy assembly to and disassembly from the outside surface of the trim panel.

These and other features and advantages of the invention will be more fully understood from the following detailed description of the invention taken together with the accompanying drawings.

BRIEF DESCRIPTION OF THE DRAWINGS

In the drawings:

FIG. 3 is a perspective view of a support member utilized in FIG. 2 according to the invention;

FIG. 4 is is a side view of the container holding assembly shown in FIG. 1 illustrating the installation of the same;

FIG. 5 is a perspective view of the container holding assembly as shown in FIG. 1 illustrating the flexibility thereof;

DETAILED DESCRIPTION OF THE INVENTION

Figure 1:
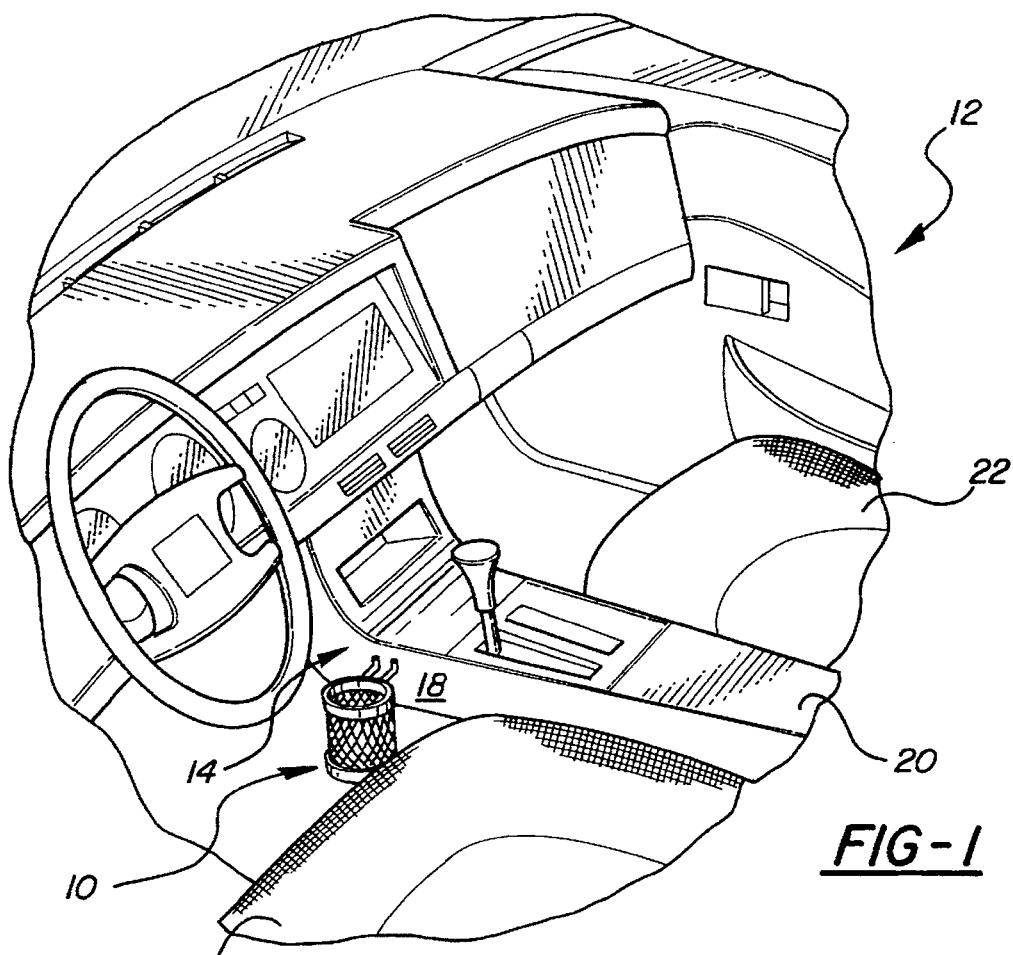
FIG. 1 is a perspective view of a preferred embodiment of a container holding assembly according to the invention shown in its preferred environment.

Referring now to FIGS. 1–5 of the drawings in detail, numeral 10 generally indicates a container holding assembly according to the invention. Container holding assembly 10 is shown mounted within a vehicle 12. Preferably, container holding assembly 10 is mounted or fastened to an interior trim panel 14 of predetermined thickness having an inside surface 16 and an outside surface 18. Container holding assembly 10 is shown mounted to the side of a center console/arm rest 20 located between front bucket seats 22, 24. It will be appreciated that container holding assembly 10 may be fastened to other areas of the interior of vehicle 12 such as the door trim panel or the like.

Container holding assembly 10 comprises an arcuate support member 26 and a cylindrically-shaped fabric mesh net 28 including a top end annular border 30, defining an opening 32, and a bottom end annular border 34. Net 28 is secured to support member 26 at top end border 30 so that net 28 is suspended in a free state from support member 26. Net 28 is constructed from a flexible mesh material, such as nylon or the like, so that net 28 is collapsible about an axial vertically disposed axis 29 from a first FIG. 2 position, wherein bottom end border 34 is spaced apart from top end border 30, and a second FIG. 5 collapsed position, wherein bottom end 34 approximately meets top end 30. The flexible mesh material also allows for skewed movement of net 28 from side to side as shown in phantom in FIG. 5.

Figure 2:
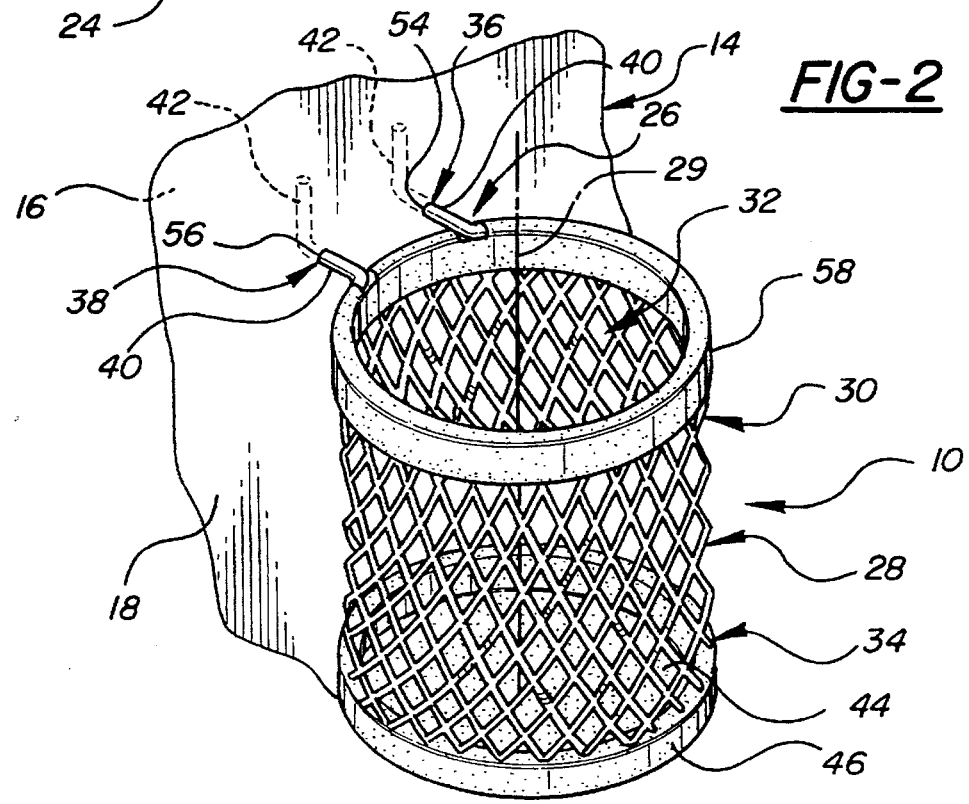
FIG. 2 is a close-up perspective view of the container holding assembly shown in FIG. 1.

With reference to FIGS. 2 and 3, the support member 26 includes first and second spaced apart identical end portions 36, 38. Each first 36 and second 38 end portion define a L-shaped fastener including a horizontal length 40 and a vertical length 42 for fastening assembly 10 to vehicle 12. In the disclosed embodiment, horizontal length 40 and vertical length 42 are substantially equal in length. The bottom end 34 is constructed from a semi-rigid sheet material, such as a plastic or a vinyl material, having a base portion 44 and an integral annular flange portion 46 extending upwardly from base portion 44 and attached to the mesh material of net 28. The semi-rigid sheet material of bottom end 34 helps maintain the cylindrical shape of net 28. Bottom end 34 may also include a circular wire loop secured in place by annular flange portion 46 for maintaining the cylindrical shape of net 28.

Support member 26 is preferably a one-piece wire form defining a substantially circular shaped closed end portion 48 terminating in parallel end portions 36, 38 which are laterally spaced apart a predetermined dimension. Closed end portion 48 spans about a circular arc, A, of greater than 180 degrees to prevent collapsing of net 28 relative to outside surface 18. In the disclosed embodiment, circular arc, A, is about 320 degrees. Further, it will be seen that horizontal lengths 40 lie in a common plane defined by the substantially circular shaped closed end portion 48. Trim panel 14 includes a pair of holes 54, 56 spaced apart a predetermined spacing equal to the predetermined dimension of spaced apart end portions 36, 38. Vertical lengths 42 are bent in a direction away from bottom end 46. Preferably, vertical lengths 42 are disposed at a 90 degree angle relative to horizontal lengths 40. Top end border 30 includes a cover 58, constructed from a trim material such as vinyl or the like, for concealing the wire form of support member 26 and for maintaining the cylindrical shape of net 28 at top end 30.

Referring now to FIG. 4, installation of container holding assembly 10 is illustrated. Vertical lengths 42 are inserted into holes 54, 56. Assembly 10 is then rotatably moved relative to trim panel 14 from an installing non-use position, wherein vertical lengths 42 are not seated against inside surface 16 of trim panel 14, to a use position (shown in phantom) wherein vertical lengths 42 are seated against inside surface 16 of trim panel 14. In this manner, assembly 10 is fastened or locked to trim panel 14 until assembly 10 is rotated to the non-use position.

Figure 6:
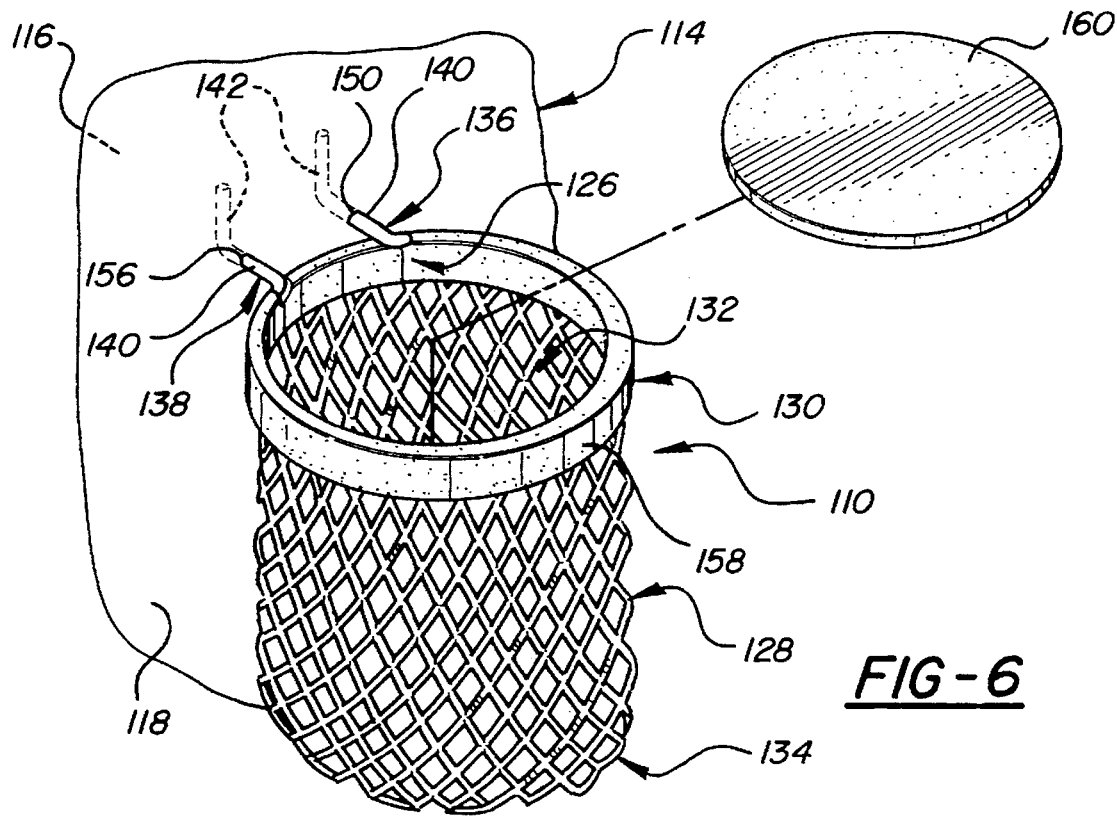
FIG. 6 is a perspective view of an alternate embodiment of a container holding assembly according to the invention.
Figure 7:
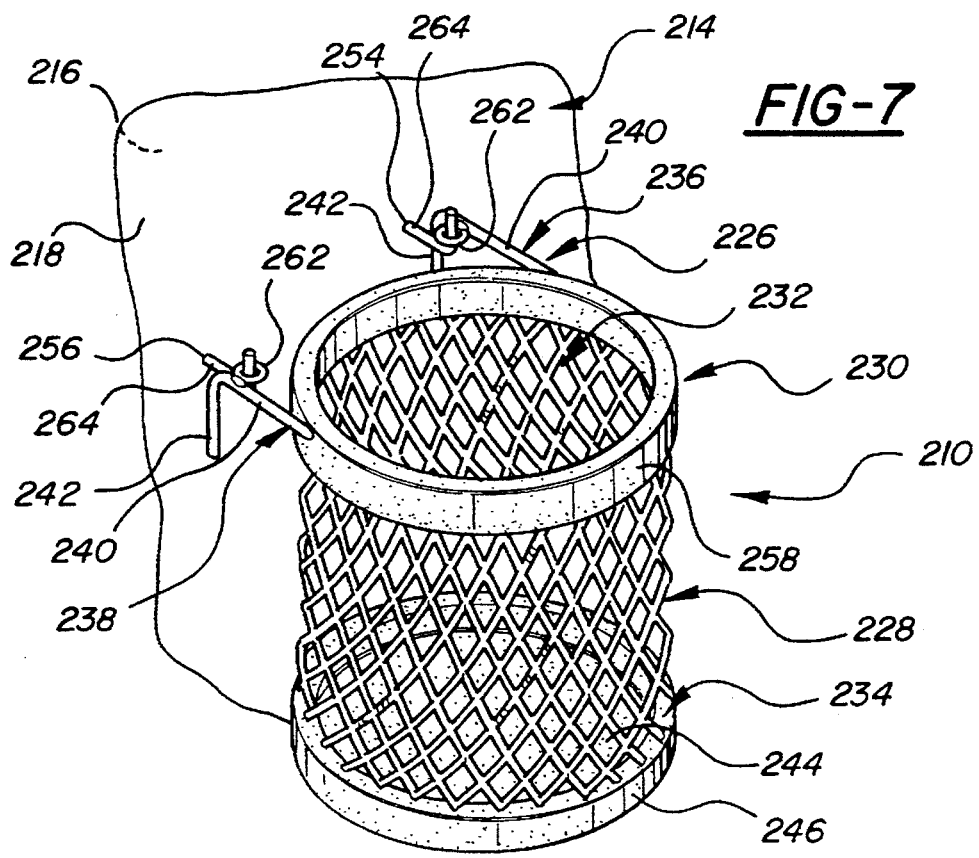
FIG. 7 is yet another embodiment of a container holding assembly according to the invention.

FIGS. 6 and 7 of the drawings illustrate alternative embodiments of container holding assembly 110, 210 according to the invention. Because the details of container holding assembly 110, 210 are similar to those of the first described embodiment, similarly ending numerals are used for like parts. The above description of the FIGS. 1–5 embodiment applies to the FIG. 6 and FIG. 7 embodiments, except as set forth below.

The embodiment of FIG. 6 differs from that of FIGS. 1–5 in the configuration and construction of the bottom end which, in this instance, is constructed from the flexible mesh material of net 128 instead of from a semi-rigid sheet material as in FIGS. 1–5. A disk 160 is inserted through opening 132 and located at the bottom end 134 for maintaining the net bottom end cylindrical shape.

FIG. 7 shows another embodiment of container holding assembly 210 similar to FIGS. 1–6, except that L-shaped fasteners include circular eye loops 262 and vertical lengths 242 are oriented in a downward position pointing towards bottom end 234 instead of away from bottom end 234. Additionally, assembly 210 includes hooks 264 mounted to trim panel 214 and protruding from outside surface 218. Circular loops 262 are matingly engaged with hooks 264 and vertical lengths 242 engage outside surface 218 of interior trim panel 214.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A container holding assembly; said assembly comprising:

vehicle including an interior trim panel having an inside surface and an outside surface;

an arcuate wire loop support member;

a cylindrical net including a top end defining an opening and a bottom end, said net being secured to said support member at said top end so that said net is suspended in a free state from said support member; wherein said net is constructed from a flexible mesh material; and wherein; said support member includes first and second spaced apart ends, said first end defining a first fastener and said second end defining a second fastener for fastening said support member to said outside surface of said trim panel;

said first and said second fasteners being L-shaped;

said first and second fasteners comprising a horizontal leg and a vertical leg;

said trim panel including a pair of holes extending through said trim panel, said holes laterally spaced a predetermined dimension;

said vertical legs being at least partially inserted into said associated pair of holes; and said support member being rotatably moveable relative to said trim panel from a use position, wherein said vertical legs are seated against said inside surface of said trim panel, to a non-use position, wherein said vertical legs are not seated against said inside surface.

* * * * *